United States Patent [19]

Kawai et al.

[11] 4,109,287

[45] Aug. 22, 1978

[54] PROCESS FOR RECORDING INFORMATION OR SOUND AND PROCESS FOR PREPARATION OF RECORDING MATERIALS USED THEREFOR

[75] Inventors: Satoshi Kawai, Chigasaki; Hajime Sato, Hiratsuka; Toshimatsu Sakai, Odawara, all of Japan

[73] Assignee: Pilot Man-Nun-Hitsu Kabushiki Kaisha, Tokyo

[21] Appl. No.: 543,006

[22] Filed: Jan. 20, 1975

Related U.S. Application Data

[63] Continuation-in-part of Ser. No. 326,102, Jan. 23, 1973, abandoned.

[30] Foreign Application Priority Data

Apr. 14, 1972 [JP] Japan .................................. 47-37421

[51] Int. Cl.² ...................... G11B 5/74; C25D 5/00; C25D 11/00; C09D 5/23
[52] U.S. Cl. ...................................... 360/131; 204/42; 252/62.51
[58] Field of Search .............................. 360/131–136; 204/35, 42; 252/62.51

[56] References Cited

U.S. PATENT DOCUMENTS 3,554,798  1/1971  Nacci .................................. 360/131

*Primary Examiner*—Robert S. Tupper
*Attorney, Agent, or Firm*—Wenderoth, Lind & Ponack

[57] ABSTRACT

This invention provides a magnetic recording material having a regular orientation which comprises aluminum or aluminum alloy on the surface of which a film having a great number of micro pores is formed by an anodic oxidation, each of said pores being packed with a magnetic substance. As compared with conventional magnetic recording materials, this magnetic recording material is excellent in anisotropy, ability to effect high density recording, uniformity of unit magnetic elements in size and dimension ratio with regular orientation, and highness of leakage flux.

2 Claims, 74 Drawing Figures

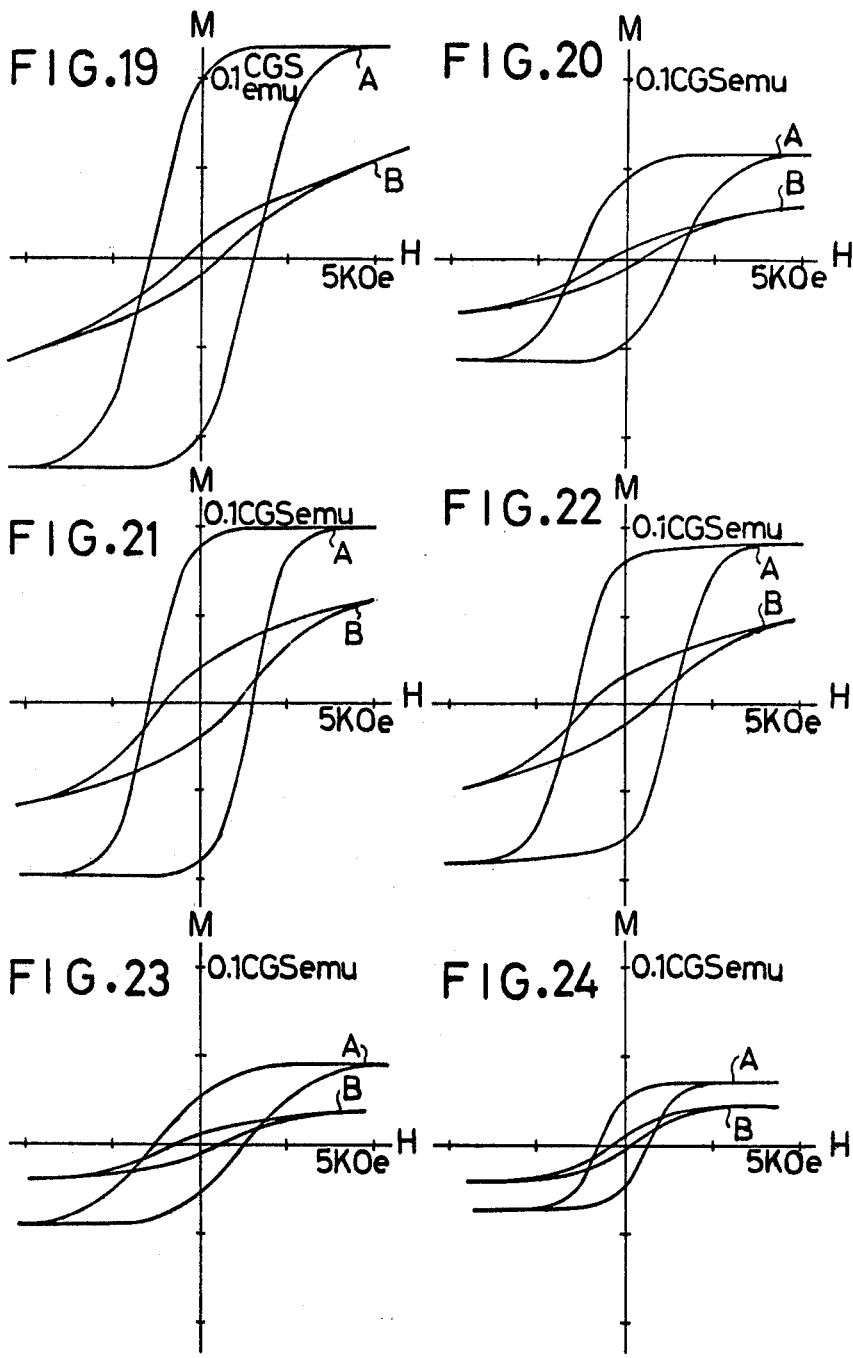

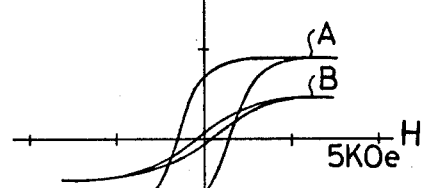
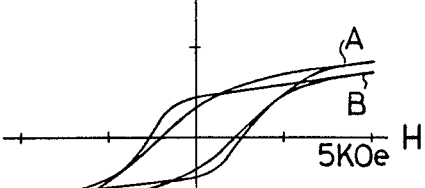
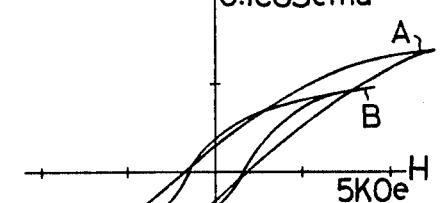
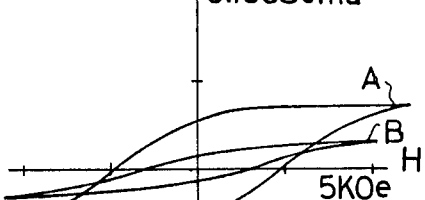
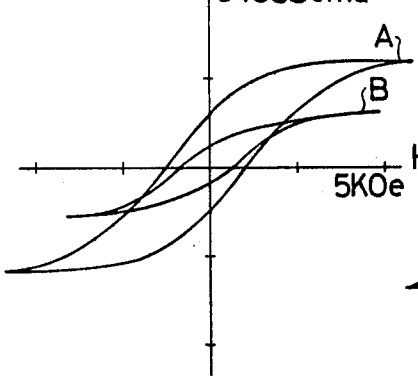
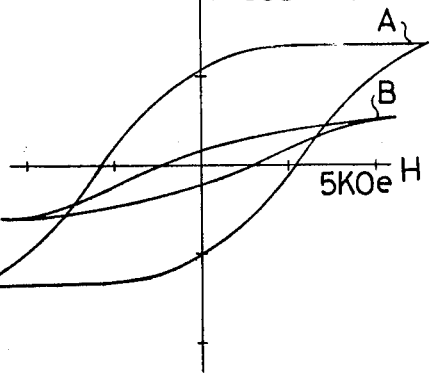

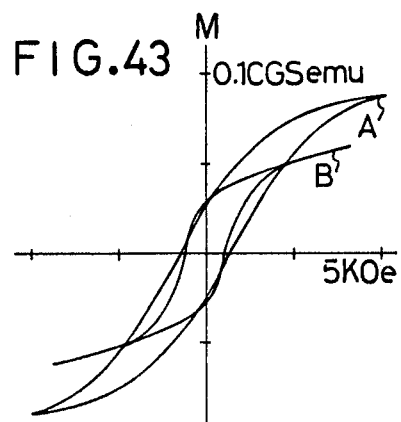
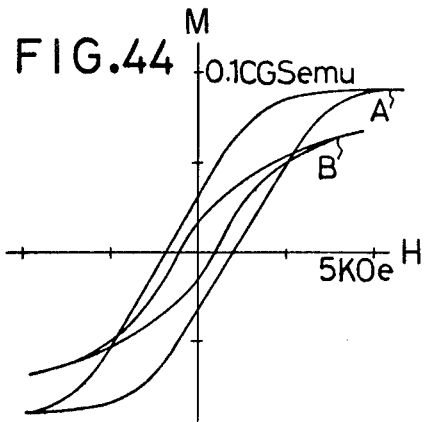
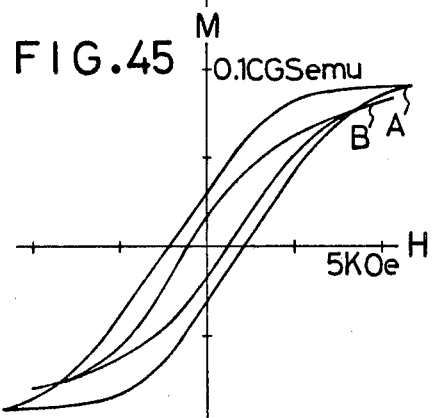
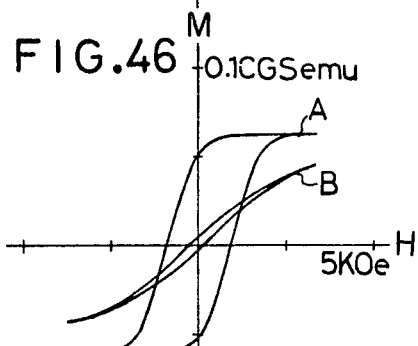
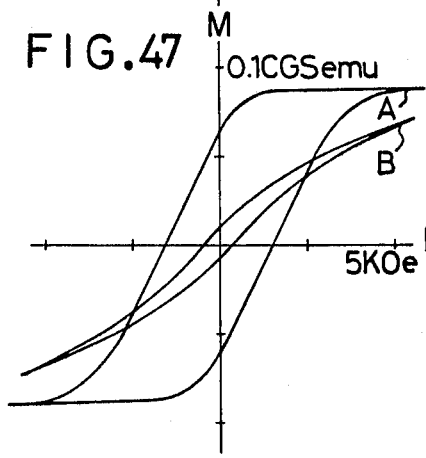
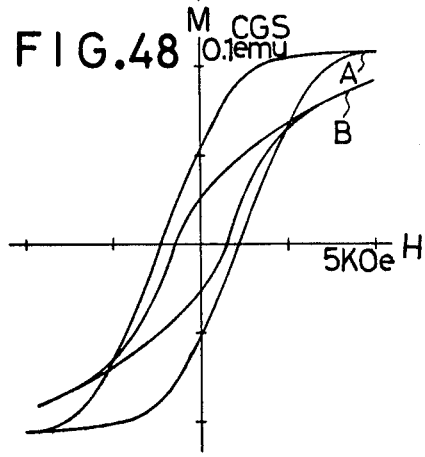

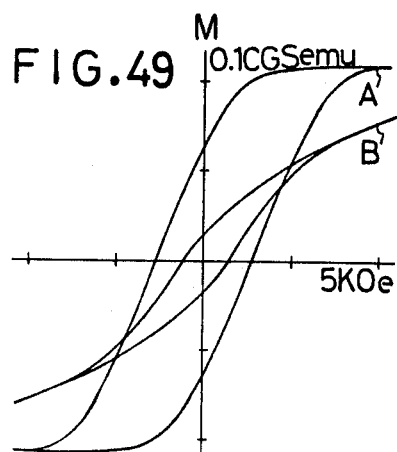
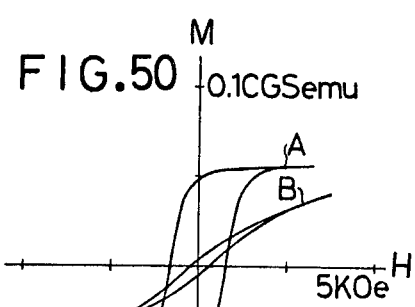
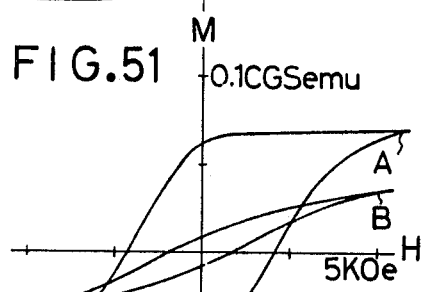
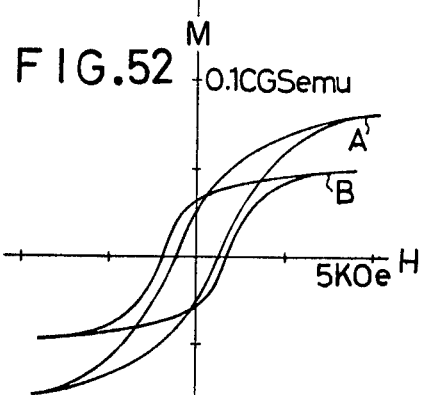
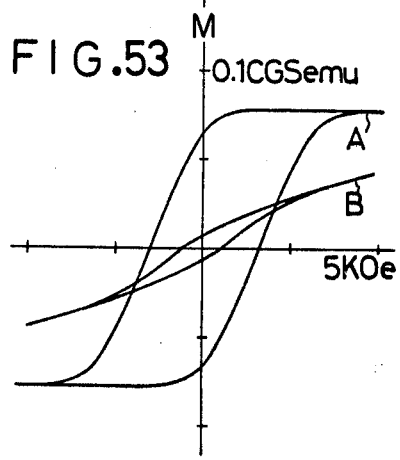
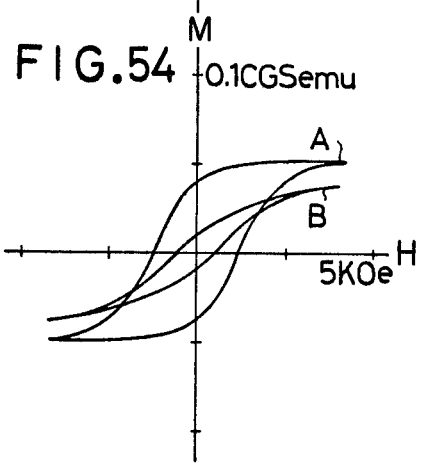

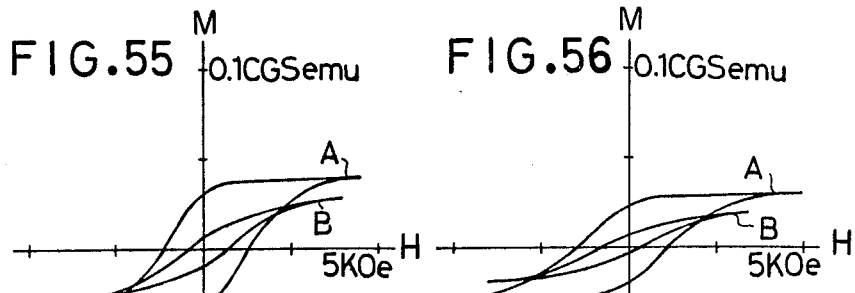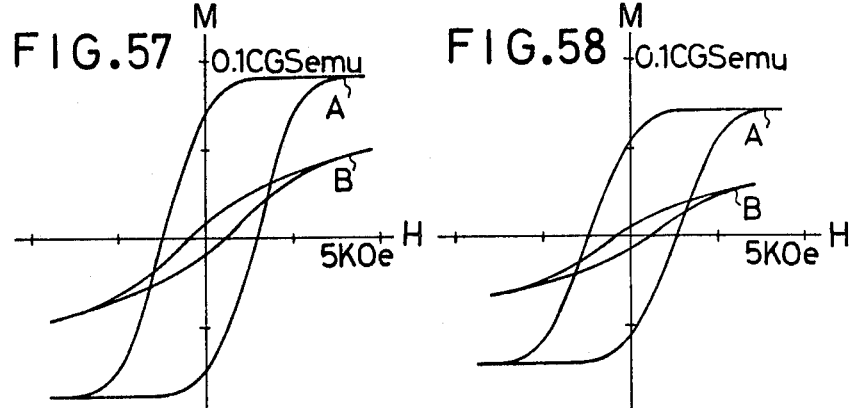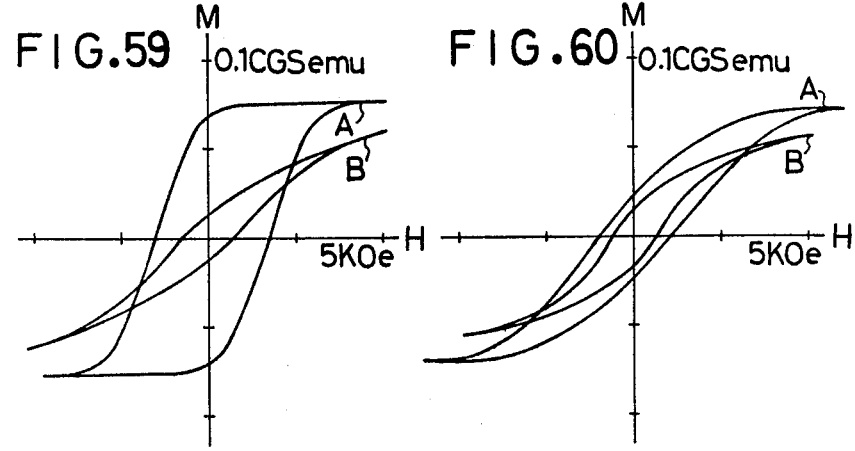

PROCESS FOR RECORDING INFORMATION OR SOUND AND PROCESS FOR PREPARATION OF RECORDING MATERIALS USED THEREFOR

CROSS REFERENCE TO RELATED APPLICATIONS

This application is a continuation-in-part of application Ser. No. 326,102, filed January 23, 1973, now abandoned.

BACKGROUND OF THE INVENTION

This invention relates to a process for recording and reading information or sound on a novel magnetic recording material having a regular orientation and retaining a coercive force of a wide range. More particularly, the invention relates to a magnetic recording material having a regular orientation which comprises aluminum or aluminum alloy on the surface of which a film having a great number of pores is formed by an anodic oxidation treatment (the first electrolytic treatment), each of said pores containing a magnetic substance deposited therein by a packing treatment (the second electrolytic treatment), and to a process for the preparation of such magnetic recording material.

Conventional magnetic recording materials are prepared by coating a magnetic substance powder on a substrate such as a metal, a plastic material and the like with use of a binder or by plating a magnetic substance in the liquid or vapor phase onto such a substrate as mentioned above. However, these conventional magnetic materials are defective and insufficient in anisotropy, high density recording, uniformity in size and dimension ratio of unit magnetic elements and regularity in orientation, and highness of leakage flux. These problems involved in conventional magnetic recording materials will now be described more detailedly.

1. Shape Anisotropy

By the term "shape anisotropy" is meant such a property that the substance is readily magnetized particularly in one specific direction. If a unit magnetic element having such property is magnetized, the magnetic force is hard to erase depending on the highness of said property. Therefore, it is desired that a magnetic recording material has a high anisotropy. In order to enhance or improve the shape anisotropy, it is necessary to increase the acicular ratio of the long axis (the dimension in the length direction) to the short axis (the dimension in the lateral direction) in individual unit magnetic elements. In a conventional method comprising coating a magnetic substance powder on a substrate, it is impossible to increase the acicular ratio of the long axis to the short axis in the individual unit magnetic element (one powder particle) beyond a certain limit, and in this conventional method it is very difficult to obtain a magnetic recording material in which the size distribution is within a very narrow range in unit magnetic particles. For these reasons, in magnetic recording materials formed by coating a magnetic substance powder on a substrate it is impossible to heighten the anisotropy beyond a certain limit.

In another conventional method comprising plating a magnetic substance on a substrate, it is possible to heighten the anisotropy by adjusting the thickness of the plated layer or the size of crystals of the plated magnetic substance. However, this adjustment involves many technical difficulties, and enhancement of the anisotropy results frequently in degradation of other properties; therefore, it is impossible to obtain a magnetic recording material having a well-balanced combination of various magnetic characteristics.

2. High Density Recording

By the term "high density recording" is meant a type of recording which can be accomplished at a high density of information accumulation. Namely, more unit informations (bits) are recorded at a smaller area of the magnetic recording material by magnetization. Accordingly, in order to accomplish the high density recording, it is necessary to reduce the length of the individual magnetic domain to be recorded, and as the size of the individual magnetic domain is smaller, the recording can be conducted at a higher density. In the case of conventional magnetic recording materials formed with use of a magnetic substance powder, in order to accomplish high density recording, it is essential that the magnetic substance particles should have as small a size and as great a dimension ratio as possible. However, because of preparation limitations, it is impossible to reduce the length of the long axis below about 0.2 to about 0.5 $\mu$m. In the case of magnetic recording materials formed by the plating method, even if the recording density is enhanced by improving properties of a magnetic substance, because of undesirable reduction of output or technical limitations of the plating method, it is impossible to reduce the plating film thickness below about 0.5 $\mu$m, and it is considered that the minimum length of the magnetic domain to be recorded depends on the above minimum value of the film thickness.

3. Uniformity in size and dimension ratio in individual magnetic unit elements and regularity in orientation In magnetic recording materials, in order to increase outputs, it is necessary that regularity can be accomplished in the following three factors, namely the size of individual magnetic unit elements, the dimension ratio and the orientation. In conventional magnetic recording materials prepared with use of magnetic substance powder, a deviation is observed in the size of individual magnetic unit elements (one powder particle) and the dimension ratio is not uniform. Therefore, it is very difficult to obtain uniform outputs in these conventional magnetic recording materials.

4. High Leakage Flux

In order to obtain high outputs, it is necessary to increase the leakage flux, and in order to increase the leakage flux, it is necessary to increase the thickness of the magnetic layer. In conventional magnetic recording materials prepared either by coating a magnetic substance powder on a substrated or by plating a magnetic substance or a substrate, when the thickness of the magnetic layer in increased, the recording density is reduced because of the demagnetizing field, and the high density recording becomes impossible.

We have conducted extensive research with a view to developing magnetic recording materials free of the above defects 1 to 4 inevitably involved in conventional magnetic recording materials, and have now found that when aluminum or aluminum alloy is subjected to an anodic oxidation (the first electrolytic treatment) and a magnetic substance is deposited electrolytically into micro pores of the resulting oxide film up to the opening or up to the position just below the opening of each micro pore (the second electrolytic treatment), there is obtained a magnetic recording material having a regular orientation and a coercive force of a wide range, which is excellent in shape anisotropy, ability ot effect high density recording, uniformity of unit magnetic elements in size and dimension ratio with regular orientation, and highness of leakage flux.

SUMMARY OF THE INVENTION

It is therefore a primary object of this invention to provide a process for recording information or sound and reading the recorded information or sound by using a magnetic recording material having a regular orientation and a coercive force of a wide range, which is excellent in shape anisotropy, ability to effect high density recording, uniformity of unit magnetic elements in size and dimension ratio with regular orientation, and highness of leakage flux.

It is another object of this invention to provide a magnetic recording material which is excellent in wear resistance and has a high residual magnetic flux without degradation of the recording density.

Still another object of this invention is to provide a magnetic recording material which can possess coercive force and residual magnetic flux of very wide ranges.

A still further object of this invention is to provide a process for preparing such excellent magnetic recording materials.

A process for providing a substance similar to the recording material of this invention, may have been known heretofore as a process for coloring or coating metal plates, but it has not been known at all that such a substance has excellent magnetic properties like those of the recording material of this invention.

Other objects and advantages of this invention will be apparent from the description given hereinbelow.

In accordance with this invention, there is provided a magnetic recording material having a regular orientation which comprises aluminum or aluminum alloy on the surface of which a film having a great number of micro pores is formed by an anodic oxidation treatment, each of said micro pores being packed with a magnetic substance.

DETAILED DESCRIPTION OF THE INVENTION

This invention will now be illustrated detailedly, occasionally by referring to the accompanying drawings.

In the process of this invention, the recording and reading methods themselves have been well-known heretofore. Thus, in the process of this invention, information or sound is recorded on the magnetic recording material by magnetizing the magnetic recording material with magnetic flux generated from a magnetic head, and the so recorded information or sound is read by a magnetic head by sensing magnetic flux generated from the magnetic recording material which has stored the information or sound as a magnetic energy in the above recording step.

The magnetic recording material used in and produced by the process of this invention (in this specification, sometimes referred to as the magnetic recording material of this invention) will be explained in detail hereinafter.

Figure 1:
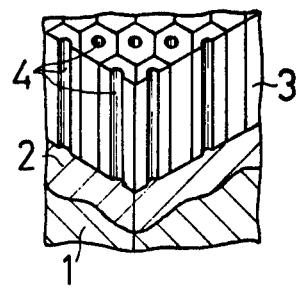
FIG. 1 is a diagram illustrating the structure of one embodiment of the anodic oxide film having micro pores packed with a magnetic substance, which is formed on the surface of aluminum or aluminum alloy in accordance with this invention.

In the magnetic recording material of this invention, it is indispensable that a film having a great number of micro pores is formed on the surface of aluminum or aluminum alloy by an anodic oxidation (the first electrolytic treatment) and that each micro pore contains a magnetic substance electrolytically deposited therein (the second electrolytic treatment). An instance of the anodic oxide film formed on aluminum or aluminum alloy is illustrated in FIG. 1. By the first electrolytic treatment, which will be detailed hereinbelow, an anodic oxide film 3 is formed on a substrate 1 of aluminum or aluminum alloy through a barrier layer 2. Columnar pores 4 are grown vertically through the film 3 and opened on the film surface to form openings. These pores are usually disposed at intervals of about 400 to 2000A (387 to 645 A in the case of sulfuric acid-electrolyte). Accordingly, when a magnetic substance is electrolytically packed in such micro pores, individual unit magnetic elements are disposed at intervals equal to the above-mentioned pore intervals.

In general, the magnetic substance is packed into each micro pore up to the opening or up to the position just below the opening. Therefore, in the magnetic recording material of this invention, the dimension ratio, namely the ratio of the long axis to the short axis, is much greater than in conventional magnetic recording materials according to the coating or plating method. As a result, the shape anisotropy can be greatly heightened in the recording material of this invention as compared with conventional recording materials.

As mentioned above, in conventional magnetic recording materials according to the coating or plating method, it is impossible to reduce the length of the magnetic domain below some limits for technical reasons. In contrast, in the magnetic recording material of this invention, the magnetic substance is not coated or plated but packed in pores disposed at intervals of about 400 to about 2,000 A (387 to 645 A in the case of sulfuric acid-electrolyte). Thus, individual unit elements of the packed magnetic substance are disposed at intervals corresponding to said pore intervals. Therefore, the length between the centers of the two elements, i.e., the length of the magnetic domain, can be reduced greatly as compared with the conventional recording materials.

Further, since intervals of each micro pore of anodic oxide film can be reduced by adjusting the treatment conditions appropriately, it is possible to reduce the length between the two magnetic domains to be recorded below 400 A. Therefore, the magnetic recording material of this invention has many excellent magnetic characteristics over conventional recording materials, especially with respect to the ability to effect high density recording.

As mentioned above, in order for a magnetic recording material to have a uniform output, it is necessary that the uniformity can be attained in the size of individual unit magnetic elements, the acicular ratio and the orientation, but the conventional magnetic recording materials are insufficient in this point. In contrast, in the magnetic recording material of this invention, because of the specific structure in which a magnetic substance is packed in Columnar pores grown vertically in anodic oxide film formed on aluminum or aluminum alloy, the deviation of the size and dimension ratio in individual unit magnetic elements can be reduced very greatly, because the deviation of the dimension is very small in such pores formed by the anodic oxidation. Further, since these pores are grown in the anodic oxide film in the direction vertical to the aluminum or aluminum alloy surface, individual unit magnetic elements formed in the state packed in such pores should naturally be disposed in the same direction regularly and distributed uniformly. Thus, in the magnetic recording material of this invention, it is possible to uniformalize the output effectively.

Figure 3:
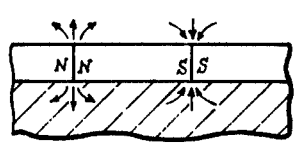
FIGS. 3 and 4 are sectional views illustrating the leakage flux in conventional magnetic recording materials prepared by the magnetic substance plating method and the magnetic powder coating method, respectively.
Figure 4:
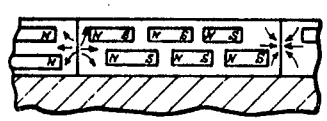

The manners of utilizing the leakage flux in conventional magnetic recording materials prepared by the plating and coating methods are illustrated in FIGS. 3 and 4, respectively, As is seen from these figures, the effective leakage is low and hence, only a low output is obtained in these conventional magnetic recording materials. Further, in such conventional magnetic recording materials, when the thickness of the magnetic layer in increased so as to increase the leakage flux, the demagnetizing field is formed, resulting in reduction of the recording density. For this reason, in such case high density recording becomes impossible in the conventional recording materials.

Figure 2:
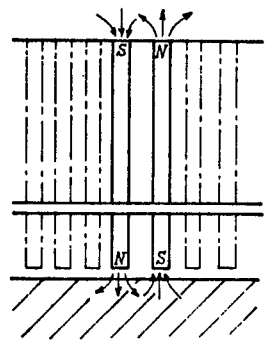
FIG. 2 is a sectional diagram illustrating the leakage flux in the magnetic recording material of this invention.

In contrast, since the magnetic recording material of this invention is composed of longitudinal highly magnetic unit elements and the leakage flux of such elements is utilized as illustrated in FIG. 2, the flux density is very high. Further, even when the thickness of the magnetic layer is increased so as to obtain a higher magnetic output, the recording density is not reduced. More specifically, since in the magnetic recording material of this invention the magnetization is effected in the vertical direction by utilizing the magnetic property of the magnetic substance packed Columnar pores of the anodic oxide film, even if the volume of the magnetic material is increased by increasing the length of the packed magnetic substance (increasing the thickness of the anodic oxide film of aluminum or aluminum alloy), the recording density is not reduced at all and no demagnetizing field is formed, which will readily be understood from FIG. 2.

As is seen from the foregoing explanation, the defects 1 to 4, mentioned above, of the conventional recording materials can be overcome effectively and conveniently in the magnetic recording material of this invention, and therefore, this invention makes great contributions to the art.

It is one of the important features of this invention that a magnetic substance is deposited in pores of the anodic oxide film of aluminum or aluminum alloy. In general, the magnetic substance is packed in each pore fully from the bottom thereof up to the opening thereof, or it is packed from the bottom of the pore up to the position just below the opening of the pore. It is preferred, however, that the magnetic substance is packed in each pore up to the position just below the opening thereof. In case the magnetic substance is packed fully up to the opening of the pore, powders of the oxide film and magnetic substance are produced by frictional abrasion on the surface of the magnetic recording material at parts having contacts frequently with a magnetic head, and powders of the magnetic material sometimes exert bad influences on the recording. For this reason, it is preferred that the magnetic substance is packed up to the position just below the opening of the pore rather than up to the opening of the pore.

As a result of our research, it has also been found that a magnetic recording material of this invention having such excellent properties as detailed above can be prepared conveniently by a process comprising subjecting aluminum or aluminum alloy to an anodic oxidation (the first electrolytic treatment) to thereby form on the surface thereof a film having a great number of micro pores and depositing electrolytically a magnetic substance in said pores from the bottom thereof up to the opening or up to the position just below the opening thereof (the second electrolytic treatment).

This process for preparing magnetic recording materials of this invention will now be illustrated.

At first aluminum or aluminum alloy is subjected to an ordinary anodic oxidation. Not only pure aluminum but also aluminum alloys of JIS series of Nos. 3000, 5000 and the like are used in the form of rolled sheets, molded plates, foils and the like. It is also possible to use laminated sheets and foils of pure aluminum and aluminum alloys. Still further, aluminum cast products such as AC7A, AC7B and hydronalium aluminum may also be used conveniently.

In order to obtain good adhesion of the deposited magnetic substance to the anodic oxide film produced by anodic oxidation in a certain medium such as oxalic acid or phosphoric acid, it is preferable that the aluminum alloy used in the present invention contain a predominant content of aluminum, more preferably not less than about 90% of aluminum.

In preparing anodic oxide films on surfaces of such aluminum materials by the first electrolytic treatment, the smoothness of the film surface is greatly influenced by the surface condition of the aluminum substrate to be used. Thus, starting aluminum substrates may be ones that have been subjected to such finishing treatment as fine roll finishing, super-finishing and chemical or electrochemical polishing according to need.

As the electrolyte to be used in the first electrolytic treatment, there may be employed acidic electrolytes containing as main ingredients inorganic and organic acids such as sulfuric acid, chromic acid, oxalic acid, phosphoric acid, sulfuric acid-oxalic acid, sulfuric acid-phosphoric acid and sulfuric acid-sulfosalicyclic acid, and alkaline electrolytes containing as main ingredients sodium hydroxide, trisodium phosphate, ammonium borate, sodium borate, sodium gluconate and other alkaline salts.

In case the first electrolytic treatment is carried out by employing an acidic electrolyte and a direct current, a hard film is obtained. When the electrolysis is effected under an alternating current with use of an acidic electrolyte, a relatively flexible film is obtained. When an alkaline electrolyte is used and the electrolysis is effected under a direct current, a rather soft film excellent in flexibility is obtained.

In each case, the resulting anodic oxide film has a structure such as diagramatically shown in FIG. 1. Namely, Columnar pores 4 are grown in anodic oxide film 3 formed on the aluminum or aluminum alloy substrate 1 via barrier layer 2, and each pore 4 extends in the direction vertical to the film surface and forms an opening on the film surface. The pore diameter varies depending on the kind of the electrolyte used and is generally within a range of from about 100 to about 400 A. In general, the distance between the centers of the two adjacent pores is within a range of from about 400 to about 2000 A. These pores are formed regularly in the oxide film in the direction vertical to the direction of the film surface.

A magnetic substance is packed into the so formed pores from the bottom up to the opening or up to the position just below the opening. It is preferred that this treatment of packing the magnetic substance into pores of the anodic oxide film is accomplished by an electrochemical method, namely an electrolytic method (the second electrolytic treatment). The aluminum or aluminum alloy which has been subjected to the above anodic oxidation is used as one electrode, and this aluminum or aluminum alloy electrode is dipped into an electrolyte consisting of an aqueous solution containing one or more of salts of metals such as iron, cobalt, nickel, and chromium. These metal salts are usually incorporated at concentrations of 5 to 100 g/l when used alone, or at concentrations of 5 to 600 g/l when two or more of them are used in combination. Then, the electrolysis is effected by passing an electric current such as a direct current, an alternating current, a direct-alternating superimposed current and a periodic reverse current through this aluminum or aluminum alloy electrode and other suitable electrode, whereby these metals or their alloys, begin to precipitate from the bottom of each pore, and the precipitate increases in thickness and reaches the opening of the pore. The precipitated metals or alloys are considered to contain small amounts of metal oxides although the amounts are very small in view of the X-ray refraction spectorograms and saturated magnetic moments of the precipitates. Whether the precipitate reaches the pore opening or not may readily be known from the time for the second electrolytic treatment or by visual observation. For instance, while the surface of the anodic oxide film of the aluminum or aluminum alloy used as one electrode still retains a specific luster characteristic of such anodic oxide film, the precipitate is not packed up to the opening of the pore.

The reason why the electrolytic deposition is effectively conducted even with an alternating current, is explained as follows: An oxide film of aluminum or its alloy functions like a semiconductor in an electrolytic bath. Thus, the oxide film shows a high resistivity when an aluminum or its alloy is an anode, and a low resistivity when it is a cathode. Thus, the oxide film on an aluminium base metal, on an average when applied with a pure AC voltage, functions as a cathode. Accordingly, positively charged particles of magnetic substance are continually introduced into pores in the oxide film and deposited in the pores while causing discharge thereof.

The so treated aluminum or aluminum alloy is washed and dried according to customary procedures, and it may be used as a magnetic recording material as it is. It is also possible to seal pores by dipping the product in boiling water or by allowing it to stand still in compressed steam vapor.

Instances of ingredients to be incorporated into electrolytes to be used for the above first and second electrolytic treatments are illustrated below, but the scope of this invention is not limited by this illustration and ingredients equivalent to those illustrated may also be used similarly.

(I) Electrolyte for the First Electrolytic Treatment
 (1) Main Ingredients
  (a) Inorganic Acids; sulfuric acid, chromic acid, phosphoric acid
  (b) Organic Acids; sulfonic acid, sulfosalicylic acid, maleic acid, oxalic acid, phthalic acid, succinic acid, malonic acid, sulfamic acid, malic acid, tartaric acid
  (c) Alkaline Substances; sodium hydroxide, ammonium borate, trisodium phosphate, sodium borate, sodium gluconate
 (2) Additives sodium gluconate, sodium citrate, ammonium sulfate, thiourea, lauryl sodium sulfate, EDTA-4Na, acetamide, D-glucose, saponin, surface active agents (II) Electrolyte for the Second Electrolytic Treatment
 (1) Main Ingredients
  iron salts, cobalt salts, nickel salts, chromium salts (sulfuric acid, acetic acid, sodium hydroxide, ammonia and the like are used for pH adjustment)
 (2) Additives
  magnesium salts, copper salts, aluminum salts, vanadium salts, gold salts, tin salts, zinc salts, rare earth metal salts, glycerine, ethylene glycol, polyhydric alcohols, urea, ammonium sulfate, thiourea, boric acid, cresol-sulfonic acid, sulfosalicylic acid.

Conditions adopted for the first and second electrolytic treatments are outlined below.

(I) Conditions for the First Electrolytic Treatment (Anodic Oxidation Treatment)
 Temperature 0° – 40° C
 Current Density: 0.1 – 5 A/dm$^2$
 Electrolysis time: 5 – 60 minutes
 Current: alternating or direct-alternating superimposed current
 Agitation: air-blowing or liquid circulation (II) Conditions for the Second Electrolytic Treatment
 Temperature: 5°– 50° C
 Voltage: 12 – 30 V
 Electrolysis Time: 5 – 60 minutes
 Current: alternating
 pH: below 8 (preferably 2 – 8)

The product obtained by conducting the first and second electrolytic treatments under conditions such as illustrated above may be used directly as a magnetic recording material without effecting an orientation treatment or the like, though it is permissible to effect the pore-sealing treatment according to need.

Films formed by the first electrolytic treatment have generally the following properties.
1. Uniformity of Film:
 In the case of aluminum of high purity, the resulting film has a uniform thickness, and even in the case of an aluminum alloy (an alloy of aluminum with copper, magnesium, zinc, etc.), the thickness of the film is relatively uniform and the thickness uniformity is rather influenced by the kind of the electrolyte used.

2. Adhesiveness:

The adhesiveness of the film to the substrate metal is extremely high, and the film is not peeled off from the substrate by ordinary shock or bending.

3. Hardness:

As the temperature of the electrolyte is lower, the current density is higher and the acid concentration is lower, the film becomes harder. In case the resulting film is subjected to the sealing treatment with boiling water or steam, the hardness of the film is reduced to some extent. In general, in the case of the sulfuric acid electrolysis, the hardness of the resulting film reaches even Hv 200 kg/mm$^2$. With increase of the amount of an alloy component, the film becomes generally softer, and films containing copper, zinc, silicon and the like in great amounts are especially low in the film hardness. Among films formed by the oxalic acid electrolysis, the sulfuric acid electrolysis and the chromic acid electrolysis, a film formed by the oxalic acid electrolysis is hardest, the hardness of a film formed by the sulfuric acid electrolysis comes next, and the hardness of a film formed by the chromic acid electrolysis is lowest. In general, the direct current electrolysis gives a harder film than the alternating current electrolysis.

4. Porosity:

The number of the micro pores of the film is lower at a lower temperature of the electrolyte, a higher current density or a lower concentration of the electrolyte.

5. Wear Resistance:

The anodic oxide film is excellent over conventional magnetic films formed by coating or plating with respect to the wear resistance. For instance, when a silicon carbide grinding material 2C of grain size No. 80 is dropped from a height of 1000 mm at a rate of 320 g/min on a 9 μm film formed by the sulfuric acid electrolyte, the film can endure for more than 250 seconds.

The above fine properties of the anodic oxide film give great influences to capacitites of the magnetic recording material formed by subjecting the film to the second electrolytic treatment.

As mentioned above, the anodic oxide film is very excellent in wear resistance, and even it if adheres to a magnetic head as a result of abrasion, since it is non-magnetic, it does not reduce the capacities of the magnetic head.

In the magnetic recording material of this invention, coercive force and residual magnetic flux can be adjusted easily within much wider ranges than in conventional magnetic recording materials, by selecting appropriately such factors as the size and number of pores formed on the oxide film, the film thickness and the kind of the magnetic material to be packed into the pores. The coercive force is usually determined based on combination of the first electrolysis conditions and the second electrolysis conditions, and the residual magnetic flux is mainly determined by the thickness of the film formed by the first electrolysis treatment. As the film thickness increases, the length of the pore becomes greater, and hence, the volume of the magnetic substance packed in the pore increases, with the result that the residual magnetic flux can be increased.

In the magnetic recording material formed by the above-mentioned first and second electrolytic treatments, the surface retains the condition formed by the first electrolysis treatment even after the second electrolysis treatment, and pores disposed regularly through the anodic oxide film are packed with a magnetic substance to form such a structure that needle-like minute elements of the magnetic substance are aligned regularly in the direction vertical to the aluminum or aluminum alloy surface with aluminum oxide intermediating between every two adjacent elements. Because of this specific structure, the magnetic recording material of this invention can attain the above-mentioned various advantages over conventional magnetic recording materials, which will be more apparent from Examples given hereinbelow.

Characteristic features and advantages of the magnetic recording material will now be summarized.

1. Since the surface of the magnetic film is composed of aluminum anodic oxide, the magnetic recording material of this invention is excellent in wear resistance.

2. Since pores formed by the anodic oxidation are disposed regularly, magnetic elements formed by packing a magnetic substance into such pores from the bottom up to the opening or up to the position just below the opening are likewise disposed regularly. Accordingly, a particle orientation treatment need not be effected.

3. The residual magnetic flux can be heightened merely by increasing the thickness of the film to thereby increase the volume of the magnetic substance to be packed in each micro pore. Thus, since the residual magnetic flux can be heightened regardless of the disposition of unit magnetic elements, the elevation of the residual magnetic flux can be attained without degradation of the recording density.

4. The diameter of the unit magnetic element is determined by by diameter of the micro pore formed by the anodic oxidation, and it is generally within a range of about 100 to about 400 A and is much smaller than the length (the film thickness, which is usually in the range of about 3 to about 10 μm). Therefore, an excellent shape anisotropy can be attained.

5. The distance between the two adjacent unit magnetic elements, namely the distance between the two adjacent pores formed by the anodic oxidation, is usually about 400 to about 2000 A, and it is much smaller than the minimum magnetic domain length attainable in conventional magnetic recording materials. Therefore, much higher density recording can be accomplished.

6. Coercive force and residual magnetic flux can be freely chosen within wide ranges by selecting appropriate conditions of the first and second electrolytic treatments. In the magnetic recording material of this invention, a coercive force reaching 3000 Oe and a residual flux density reaching 2000 Gauss can be attained.

7. Since the film surface having a contact with a magnetic head is composed of non-magnetic aluminum oxide, even if the surface undergoes abrasion by the magnetic head, no influences are exerted on the capacities of the magnetic head by the resulting aluminum oxide powder.

This invention will now be illustrated in more detail by reference to the Examples, but the scope of this invention is not at all limited by these Examples.

EXAMPLE 1

An aluminum sheet (JIS A 1100 P-1/2 H; thickness = 0.5 mm) was subjected to the first electrolytic treatment under conditions illustrated below to form an anodic oxide film having a thickness of abotu 5 μm on the surface of the aluminum sheet, and the so treated aluminum sheet was subjected to the second electrolytic treatment under conditions illustrated below to precipitate a cobalt-nickel alloy in pores of the anodic oxide film, following which the aluminum sheet was dipped in boiling water to seal the pores.

First Electrolysis Conditions

Figure 5:
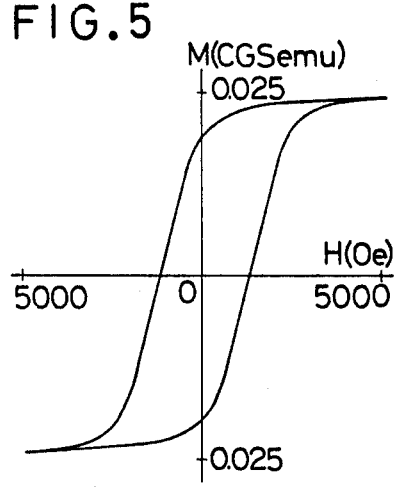
FIG. 5 is the H-M hysteresis curve of the magnetic recording material obtained in Example 1 of this invention.

Sulfuric acid: 150 g/l
Aluminum sulfate: 5 g/l
Temperature: 20° C
Current density: 1.5 A/dm$^2$ (direct current)
Treatment time: 30 minutes Second Electrolysis Conditions Cobalt sulfate: 30 g/l
Nickel sulfate: 15 g/l
Boric acid: 30 g/l Glycerine: 5 ml/l
Current density: 0.8 A/dm$^2$ (alternating current of 50 Hz)
Treatment time: 30 minutes A sample of a size of 6 mm × 6 mm (the thickness of the magnetic layer being about 5 μm) was taken from the resulting magnetic material, and the magnetic characteristics were determined in the direction vertical to the sample surface (6.0 mm in diameter) with use of a magnetmeter of the sample-vibrating type (Model VSMP-1 manufactured by Toei Kogyo Kabushiki Kaisha, Japan) to obtain the H-M curve shown in FIG. 5. The coercive force Hc of the samples was 1175 Oe and the intensity Mr of the residual magnetization was 0.106 CGS emu. The intensity Mr of the saturation magnetization was 0.133 CGS emu. Magnetization was not detected, however, in the direction parallel to the sample surface.

The fact that magnetization was detected in the direction vertical to the surface but was not detected in the direction parallel to the surface means that the sample had such an anisotropy that it is easily magnetized in the direction vertical to the surface. The fact that such high anisotropy could be obtained indicates that pores extending vertically in the anodic oxide film, when packed with an oriented crystal of magnetic substance, attain an excellent shape anisotropy in the magnetic recording material of this invention.

Since the intensity of the residual magnetization was 0.106 CGS emu and the pores were disposed regularly at intervals of about 400 A, even if about 5 of them are collectively magnetized in the same direction, the distance in which the magnetic flux direction varies is only about 2000 A. This means such a high density recording as corresponding to about 60000 BPI. In view of the fact that in commercially available magnetic recording materials formed by the plating method the maximum value is about 4000 BPI and in magnetic materials formed by the coating method the maximum value is only about 1200 BPI, it is seen that in the magnetic recording material of this invention, high density recording of about 10-fold efficiency can be attained.

The recording and regeneration tests were carried out by employing a sample of 20 cm × 30 cm × 0.5 mm of the magnetic recording material obtained in this Example and a synchrophax (sheet audio recorder) manufactured by Kabushiki Kaisha Ricoh, Japan. As a result, it was found that either the recording or regeneration was accomplished with high accuracy.

EXAMPLE 2

An aluminum alloy sheet (JIS A 5052 P - 1/2H) was subjected to the first electrolytic treatment under conditions indicated below to form on the surface on anodic oxide film having a thickness of about 3 μm, and the so treated aluminum alloy sheet was subjected to the second electrolytic treatment under conditions indicated below to precipitate an iron-cobalt alloy in pores formed in the anodic oxide film, following which the pore-sealing treatment was carried out in boiling water: The resulting magnetic recording material had magnetic characteristics similar to those of the recording material obtained in Example 1, and it exhibited good results in the recording and regeneration tests conducted in the same manner as in Example 1.

First Electrolysis Conditions

Phosphoric acid: 300 g/l
Temperature: 30° C
Current density: 2 A/dm$^2$ (direct current)
Treatment time: 15 minutes Second Electrolysis Conditions Ferrous ammonium sulfate: 20 g/l
Cobalt sulfate: 20 g/l
Thiourea: 30 g/l
Boric acid: 15 g/l
Citric acid: 3 g/l
Temperature: 20° C
Current density: 0.8 A/dm$^2$ (alternating current of 50 Hz)
Treatment time: 5 minutes

EXAMPLE 3

An aluminum alloy sheet (JIS A 3003 P -½ H) was subjected to the first electrolytic treatment under conditions indicated below to form on the surface an anodic oxide film having a thickness of about 3 μm, and the so treated aluminum alloy sheet was subjected to the second electrolytic treatment under conditions indicated below to precipitate a cobalt-nickel alloy in pores of the anodic oxide film, following which the aluminum alloy sheet was dipped in boiling water to seal the micro pores. The resulting magnetic recording material had magnetic characteristics similar to those of the recording material obtained in Example 1, and good results were obtained when it was subjected to the same recording and regeneration tests as conducted in Example 1.

First Electrolysis Conditions

Chromic acid: 25 g/l
Temperature: 40° C
Current density: 0.5 A/dm$^2$ (direct current)
Treatment time: 40 minutes Second Electrolysis Conditions Cobalt sulfamate: 30 g/l
Nickel sulfamate: 15 g/l
Boric acid: 15 g/l
Ammonium sulfate: 15 g/l
Temperature: 20° C
Current density: 0.8 A/dm$^2$ (alternating current of 50 Hz)
Treatment time: 30 minutes

EXAMPLE 4

An aluminum alloy molded plate (JIS A 6063-F) was subjected to the first electrolytic treatment under conditions indicated below to form an anodic oxide film having a thickness of about 3 μm, and the so treated aluminum alloy was subjected to the second electrolytic treatment under conditions indicated below to precipitate an iron-nickel alloy in pores of the anodic oxide film, following which the aluminum alloy was dipped in boiling water to seal the pores. The resulting magnetic recording material had magnetic characteristics similar to those of the recording material obtained in Example 1, and good results were obtained when it was subjected to the recording and regeneration tests conducted in the same manner as in Example 1.

First Electrolysis Conditions

Oxalic acid: 30 g/l
Aluminum oxalate: 5 g/l
Temperature: 30° C
Current density: 0.8 A/dm$^2$ (direct-alternating superimposed current)
Treatment time: 45 minutes

Second Electrolysis Conditions

Ferrous sulfate: 20 g/l
Nickel sulfate: 15 g/l
Thiourea: 30 g/l
Boric acid: 15 g/l
Citric acid: 2 g/l
Temperature: 20° C
Current density: 0.8 A/dm$^2$ (alternating current of 50 Hz)
Treatment time: 10 minutes

EXAMPLE 5

An aluminum sheet (JIS A 1100½H) was electrolyzed in the first electrolytic treatment bath consisting of 1 liter of water containing as ingredients for the first electrolysis 55 g of sulfuric acid and 1 g of aluminum under such conditions as a current density of 0.5 A/dm$^2$ (direct current), an electrolysis temperature of 20° C, and an electrolysis time of 20 minutes, to thereby form on the surface of the aluminum sheet an anodic oxide film having a thickness of 3.2 μm, followed by water-washing. The so treated aluminum sheet was subjected to the second electrolytic treatment in an electrolysis bath consisting of 1 liter of water containing as ingredients for the second electrolysis 30 g of cobalt sulfate, 30 g of boric acid and 20 cc of glycerine under such conditions as an electrolysis voltage of 15.2 V, an electrolysis temperature of 23° C., an electrolysis time of 10 minutes and a pH value of 5.5 under an alternating current, to thereby precipitate cobalt into each of pores formed in the anodic oxide film, from the bottom up to the position just below the opening of the pore, following which the so treated aluminum sheet was dipped in boiling water to seal the pores. Thus, a magnetic recording material was obtained.

Figure 6:
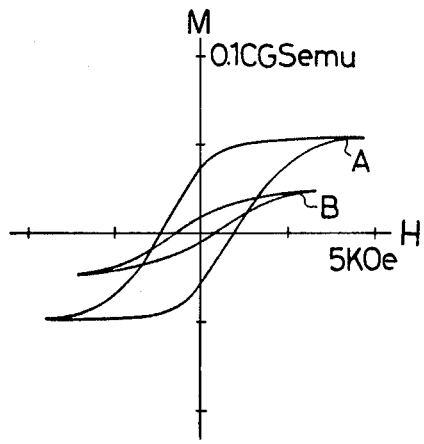
FIGS. 6 to 67 are H-M hysteresis curves of recording magnetic materials obtained in Examples 5 to 66 of this invention, respectively.

Magnetic characteristics of the so obtained magnetic recording material were determined with use of a magnetometer of the sample-vibrating type (Model VSMP-1 above-mentioned) to obtain a hysteresis curve shown in FIG. 6, in which data of the measurement conducted in the direction vertical to the surface are plotted in Curve A and data of the measurement conducted in the direction parallel to the surface are plotted in Curve B. In the hysteresis Curve A obtained by effecting the measurement in the direction vertical to the surface, the coercive force Hc was 1000 Oe and the residual magnetic flux Mr was 0.03 CGS emu, and in the hysteresis Curve B obtained by effecting the measurement in the direction parallel to the surface, the coercive fores Hc was 550 Oe and the residual magnetic flux wa 0.018 CGS emu.

EXAMPLES 6 to 66

Magnetic recording materials were prepared in the same manner as in Example 5 by conducting the first and second electrolytic treatments under conditions indicated in Table 1 by employing electrolysis baths indicated in Table 1. In Examples 61 to 65, the first electrolytic treatment was effected with use of an alternating current.

Figure 7:
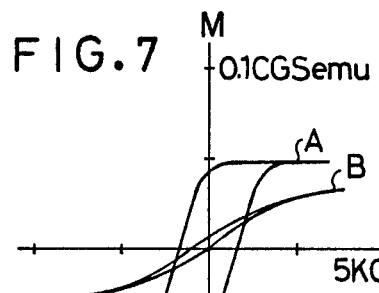
Figure 8:
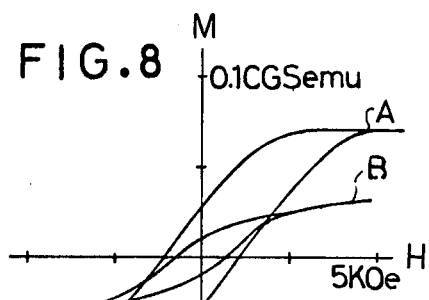
Figure 9:
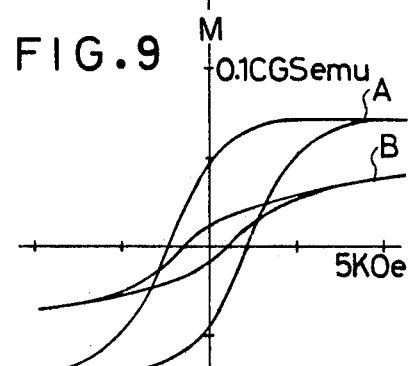
Figure 10:
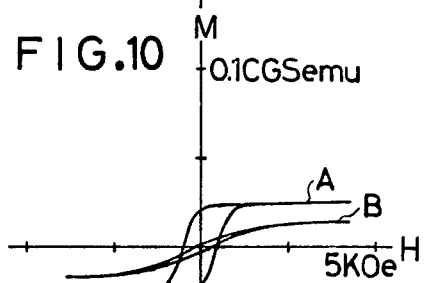
Figure 11:
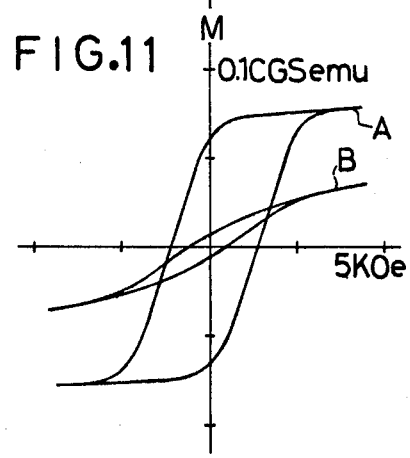
Figure 12:
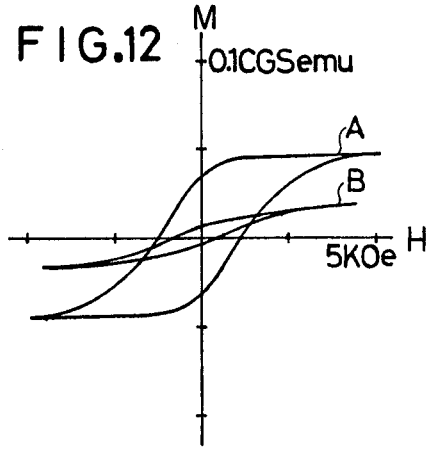
Figure 13:
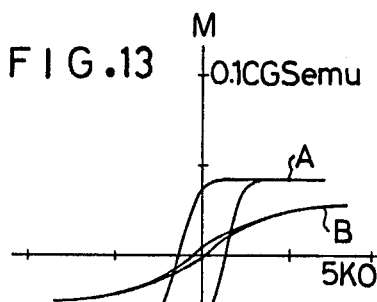
Figure 14:
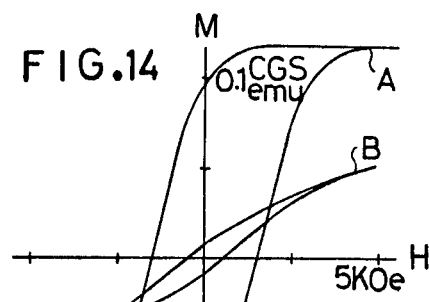
Figure 15:
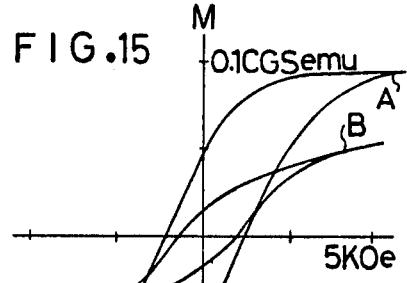
Figure 16:
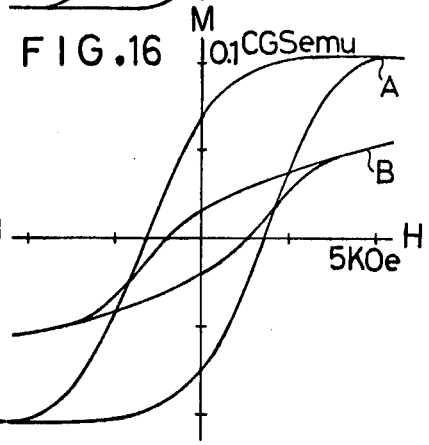
Figure 17:
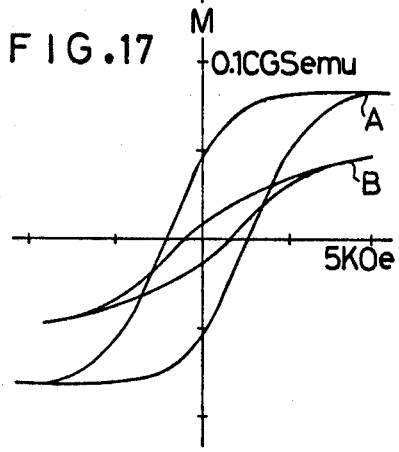
Figure 18:
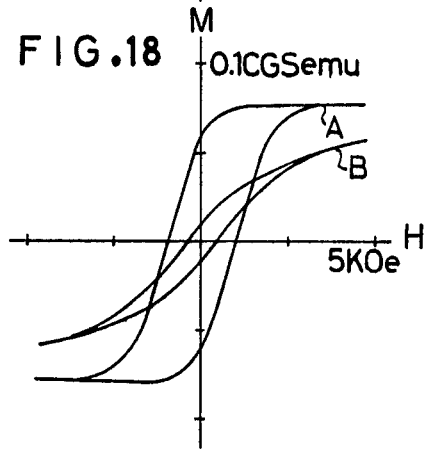
Figure 31:
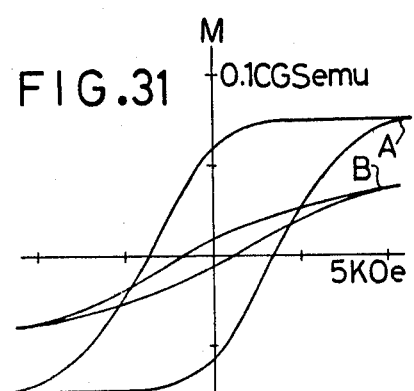
Figure 32:
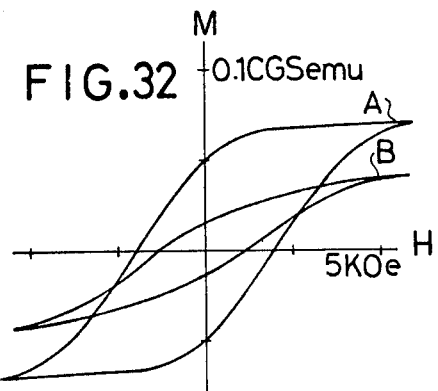
Figure 33:
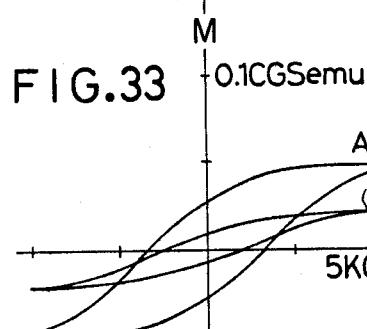
Figure 34:
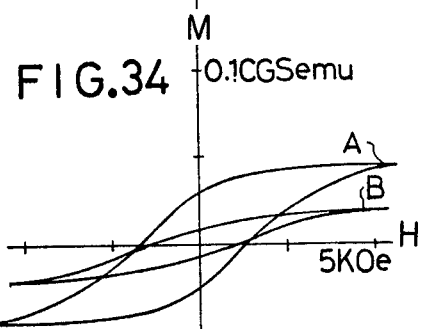
Figure 35:
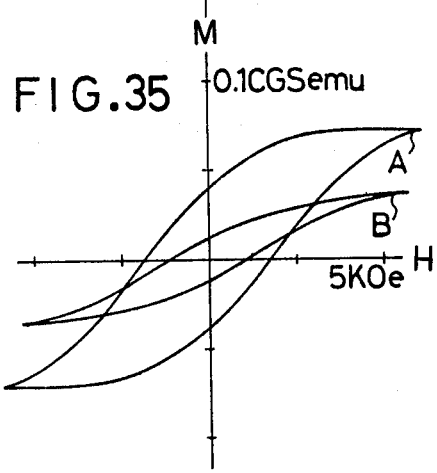
Figure 36:
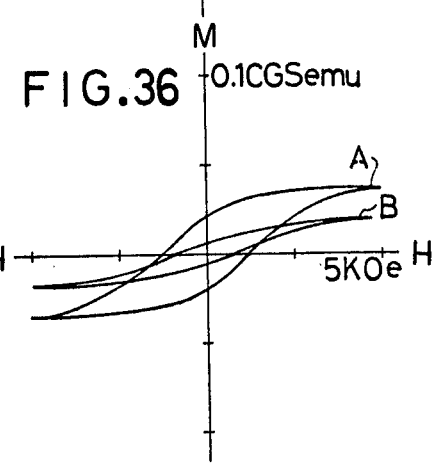
Figure 37:
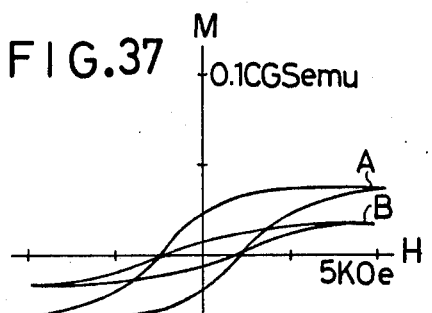
Figure 38:
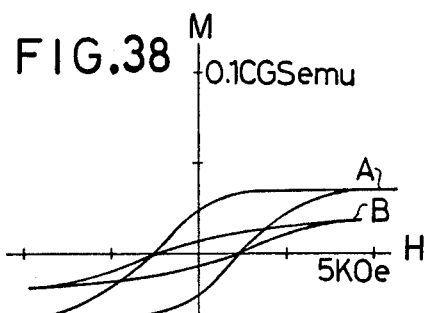
Figure 39:
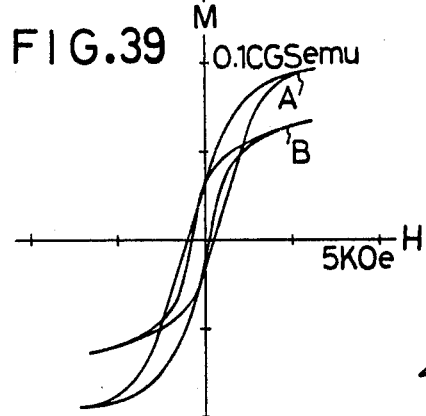
Figure 40:
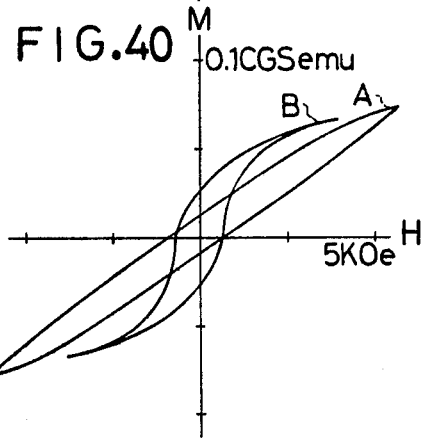
Figure 41:
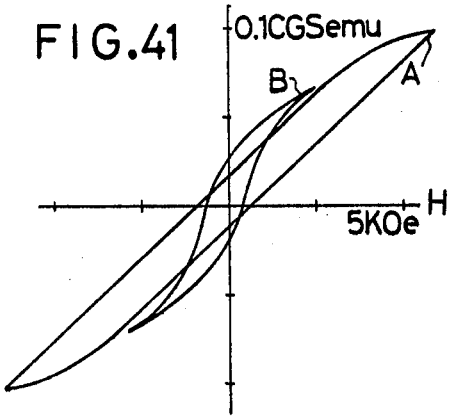
Figure 42:
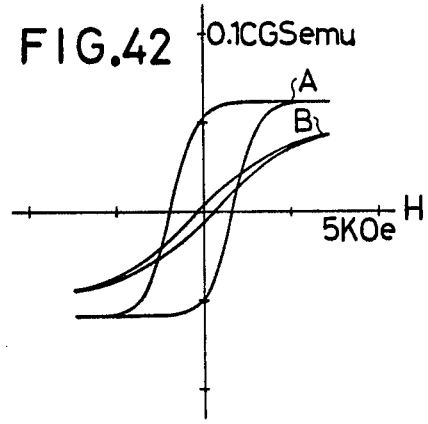
Figure 61:
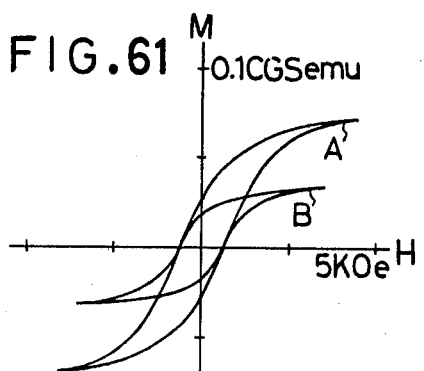
Figure 62:
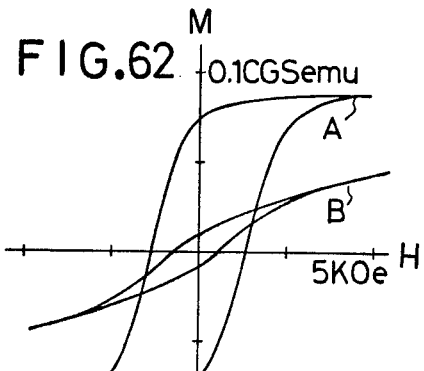
Figure 63:
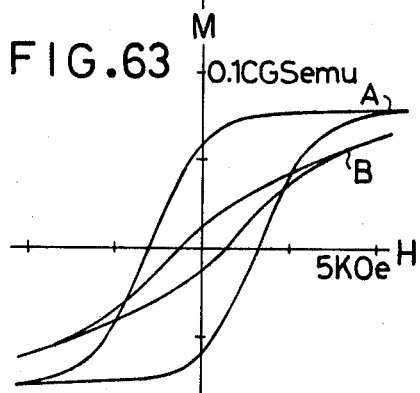
Figure 64:
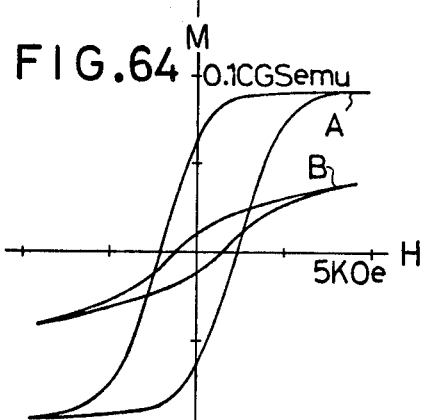
Figure 65:
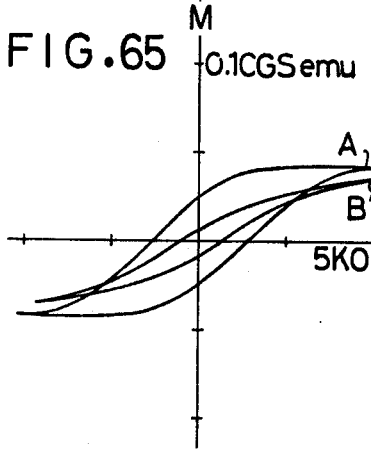
Figure 66:
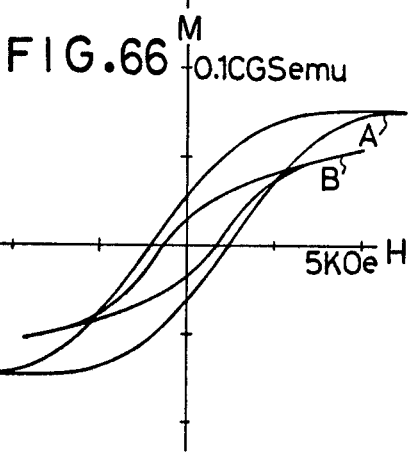
Figure 67:
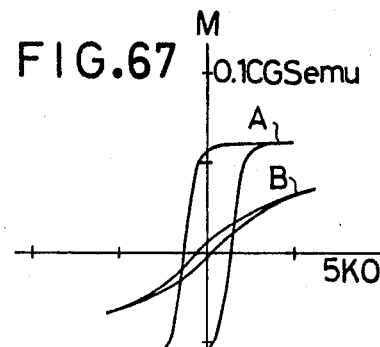
Figure 68:
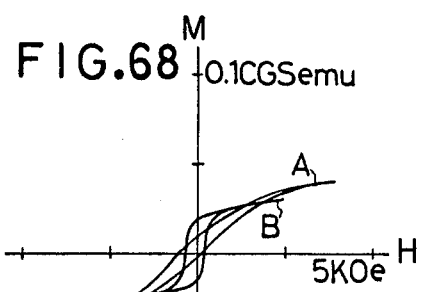
FIGS. 68 to 72 are H-M hysteresis curves of commercially available magnetic materials.
Figure 69:
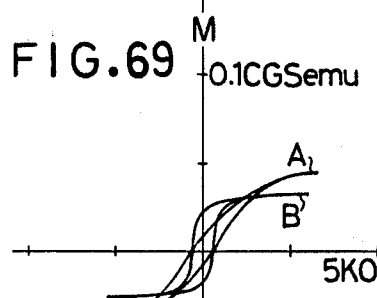
Figure 70:
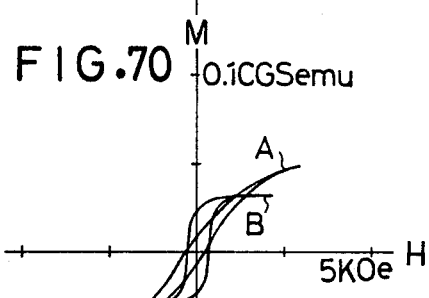
Figure 71:
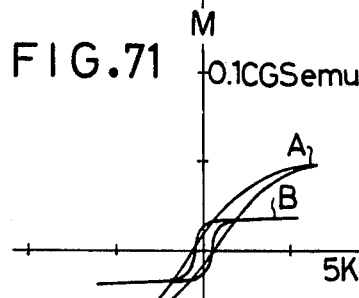
Figure 72:
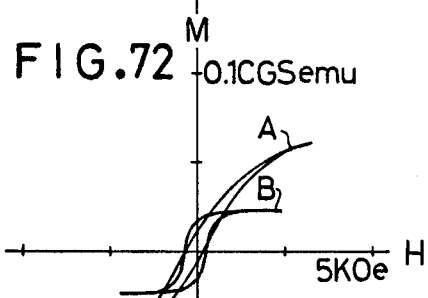

Magnetic characteristics of these magnetic recording materials were determined in the same manner as in Example 5 to obtain hysteresis curves shown in FIGS. 7 to 67, in each of which data of the measurement in the direction vertical to the surface are plotted in Curve A and data of the measurement in the direction parallel to the surface are plotted in Curve B. Data of the coersive force and residual magnetic flux are shown in Table 1, in which data of Example 5 are also shown.

Table 1

| Example No. | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|
| Ingredients of First Electrolyte | | | | | | | | | | | | | | | | |
| Sulfuric acid (g/l) | 55 | 55 | 55 | 150 | 150 | 150 | 822 | 822 | 822 | 822 | 822 | 822 | 147 | 313.5 | 147.4 | 147.4 |
| Oxalic acid (g/l) | | | | | | | | | | | | | | | | |
| Aluminum (g/l) | 1 | 1 | 1 | 2.6 | 2.56 | 2.56 | 3.74 | 3.74 | 3.74 | 2.43 | 2.43 | 2.43 | 2.69 | 3.72 | 2.69 | 2.69 |
| First Electrolysis Conditions | | | | | | | | | | | | | | | | |
| Current density (A/dm$^2$) | 0.5 | 1 | 2 | 2 | 0.5 | 1 | 2 | 4 | 1 | 2 | 2 | 1 | 1 | 2 | 1 | 1.5 |
| Temperature (° C) | 20 | 30 | 20 | 30 | 20 | 20 | 30 | 20 | 30 | 29 | 22 | 18 | 21.5 | 17.4 | 19.6 | 20 |
| Time (min.) | 20 | 30 | 40 | 20 | 40 | 30 | 20 | 20 | 20 | 15 | 15 | 20 | 30 | 25 | 30 | 60 |
| Thickness of Anodic Oxide Film (μm both sides of sheet) | 3.2 | 9.5 | 24.9 | 11.8 | 5.9 | 11.1 | 5.8 | | | | 14.6 | 10.6 | 8.3 | 16.4 | 10.3 | 24.4 |
| Ingredients of Second Electrolyte | | | | | | | | | | | | | | | | |
| Cobalt salt (g/l) | 30 | | 50 | 50 | 30 | 70 | 100 | | 15 | 50 | 50 | 100 | 50 | 50 | 50 | 70 |
| Nickel salt (g/l) | | 100 | 50 | | | 30 | | 50 | 35 | | | | 50 | | | |
| Manganese salt (g/l) | | | | | | | | 10 | | | | | | | | 50 |
| Magnesium salt (g/l) | | | | | 10 | 50 | | | | | | | 50 | 50 | 30 | |
| Iron salt (g/l) | | | | | | | | | | | | | | 60 | 30 | |
| Ammonium sulfamate (g/l) | | | | | | | | | | 30 | | | | | | |
| Boric acid (g/l) | | | 30 | | | | | | | | | | | | | |
| Glycerine (ml/l) | 30 | 15 | 20 | 15 | 20 | 20 | 30 | 30 | | 30 | 30 | 30 | 30 | | 30 | 30 |
| Urea (g/l) | 20 | | 10 | | 20 | 10 | | 20 | | 20 | 20 | | 15 | 15 | 20 | |
| Thiourea (g/l) | | | | | | | 20 | | | | | 20 | | | | 20 |
| Ammonium sulfate (g/l) | | | | | | | | 30 | 30 | 30 | | | | 30 | | |

Table 1-continued

| | | | | | | | | | | | | | | | | |
|---|---|---|---|---|---|---|---|---|---|---|---|---|---|---|---|---|
| Citric acid (g/l) | | 30 | | 30 | | 50 | | | | | | 50 | 30 | | | |
| Second Electrolysis Conditions | | | | | | | | | | | | | | | | |
| Electrolysis voltage (V) | 15.2 | 14.8 | 15.2 | 15.5 | 14.5 | 15.1 | 16.1 | 15.6 | 15.5 | 15 | 15 | 15 | 15 | 16 | 15 | 15.2 |
| Temperature (° C) | 23 | 17.4 | 36 | 27.4 | 23.6 | 41 | 25.5 | 17.8 | 45.4 | 19 | 22 | 17.8 | 24 | 24.5 | 41.8 | 23 |
| Time (min.) | 10 | 20 | 20 | 10 | 30 | 30 | 10 | 15 | 20 | 10 | 10 | 30 | 30 | 30 | 30 | 20 |
| pH | 5.5 | 5.75 | 6.1 | 3.63 | 5.8 | 5.7 | 6.3 | 6 | 5.8 | 5.8 | 5.75 | 5.88 | 5.76 | 5.98 | 5.82 | 6.38 |
| Hp in vertical direction (Oe) | 1000 | 800 | 1100 | 1100 | 475 | 1250 | 1150 | 700 | 1550 | 1150 | 1675 | 1100 | 1100 | 1550 | 1400 | 1500 |
| Mr in vertical direction (CGSemu) | 0.03 | 0.043 | 0.03 | 0.047 | 0.022 | 0.065 | 0.033 | 0.037 | 0.094 | 0.056 | 0.066 | 0.058 | 0.06 | 0.093 | 0.025 | 0.088 |
| in horizontal direction (Oe) | 550 | 200 | 880 | 600 | 200 | 550 | 650 | 150 | 600 | 880 | 1250 | 650 | 450 | 600 | 500 | 1100 |
| Mr in horizontal direction (CGSemu) 6.0 mm in diameter) | 0.018 | 0.013 | 0.01 | 0.015 | 0.002 | 0.007 | 0.005 | 0.002 | 0.01 | 0.017 | 0.018 | 0.013 | 0.011 | 0.009 | 0.003 | 0.02 |

| Example No. | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|
| Ingredients of First Electrolyte | | | | | | | | | | | | | | | | |
| Sulfuric acid (g/l) | 313.5 | | | | | | | | | | | | | | | |
| Oxalic acid (g/l) | | 46.1 | 46.1 | 46.1 | 46.1 | 46.1 | 29.3 | 29.3 | 81.5 | 81.5 | 29.3 | | | | | |
| Chromic acid (g/l) | | | | | | | | | | | | 40.7 | 40.7 | 40.7 | 74.3 | 74.3 |
| Aluminum (g/l) | 3.72 | 1.76 | 1.76 | 1.76 | 1.76 | 1.76 | 0.78 | 0.78 | 1.34 | 1.34 | 0.78 | 0.31 | 0.31 | 0.31 | 0.97 | 0.97 |
| First Elctrolysis Conditions | | | | | | | | | | | | | | | | |
| Current density A/dm²) | 2 | 0.65 | 0.6 | 0.7 | 0.4 | 0.8 | 0.9 | 0.5 | 0.85 | 1 | 0.3 | 0.44 | 0.4 | 0.5 | 0.48 | 0.28 |
| Temperature (° C) | 30 | 42.5 | 45 | 33 | 30 | 50 | 43 | 52 | 42 | 50 | 30 | 53.5 | 46.5 | 53 | 39.8 | 43.2 |
| Time (min.) | 45 | 40 | 40 | 60 | 60 | 20 | 40 | 40 | 40 | 20 | 30 | 20 | 40 | 20 | 20 | 40 |
| Thickness of Anodic Oxide Film (μm both sides of sheet) | 28.8 | 4.9 | 5.6 | 9.2 | 4.7 | 4 | 4.3 | 0.6 | 2.9 | 2.7 | | | | | | 1.8 |
| Ingredients of Second Electroyte | | | | | | | | | | | | | | | | |
| Cobalt salt (g/l) | 50 | 50 | | | 20 | 70 | 50 | 30 | 30 | 25 | 70 | 50 | 35 | 30 | 50 | |
| Nickel salt (g/l) | | | 100 | 80 | 80 | 50 | | | 15 | 25 | 30 | | 15 | 70 | 50 | 100 |
| Manganese salt (g/l) | | | | | | | | | | | 50 | | 15 | | | |
| Iron salt (g/l) | | | 100 | | | | | | | 50 | | | | 50 | | 50 |
| Ammonium sulfamate (g/l) | | | 30 | | | | | | | | | 30 | | | 30 | |
| Boric acid (g/l) | 30 | 30 | 30 | 30 | 30 | 30 | 30 | 30 | 30 | 20 | | 30 | | 15 | | 30 |
| Glycerine (ml/l) | | 20 | 15 | 15 | 20 | | 10 | 10 | 30 | 20 | 20 | | | | 15 | 10 |
| Urea (g/l) | 15 | 20 | | | 30 | | | | | | | | | | 30 | 30 |
| Thiourea (g/l) | | | | | | | | 35 | | | 20 | 20 | 30 | | | |
| Ammonium sulfate (g/l) | 30 | 15 | | | | 50 | | 30 | | | 30 | | | 50 | | |
| Citric acid (g/l) | | | | | | | | | 15 | | | | | | | |
| Second Electrolysis Conditions | | | | | | | | | | | | | | | | |
| Electrolysis voltage (V) | 15.5 | 16 | 15 | 15 | 16 | 16 | 15 | 15 | 16 | 15 | 15 | 15 | 15 | 15 | 15 | 15 |
| Temperature (° C) | 28 | 37 | 41 | 39.5 | 27 | 28 | 22 | 19.8 | 33 | 59 | 43 | 20.8 | 25.5 | 22.8 | 40 | 2.3 |
| Time (min.) | 30 | 20 | 20 | 30 | 30 | 15 | 10 | 10 | 40 | 10 | 30 | 15 | 10 | 10 | 10 | 10 |
| pH | 5.63 | 5.75 | 5.61 | 5.98 | 6.45 | 6.37 | 5.62 | 6 | 5.5 | 5.65 | 6.4 | 5.69 | 5.8 | 5.61 | 5.67 | 5.89 |
| Hc in vertical direction (Oe) | 1450 | 1300 | 700 | 800 | 1050 | 950 | 2400 | 1150 | 2800 | 1900 | 2000 | 1400 | 1500 | 1850 | 1200 | 1200 |
| Mr in vertical direction (CGSemu) | 0.08 | 01028 | 0.025 | 0.034 | 0.018 | 0.015 | 0.028 | 0.028 | 0.052 | 0.059 | 0.050 | 0.027 | 0.027 | 0.040 | 0.020 | 0.023 |
| Hc in horizontal direction (Oe) | 950 | 600 | 250 | 250 | 1350 | 800 | 1350 | 700 | 1350 | 750 | 1350 | 1175 | 1250 | 1100 | 900 | 1100 |
| Mr in horizontal direction (CGSemu) (6.0 mm in diameter) | 0.014 | 0.006 | 0.004 | 0.004 | 0.021 | 0.017 | 0.006 | 0.01 | 0.009 | 0.008 | 0.015 | 0.008 | 0.007 | 0.013 | 0.006 | 0.006 |

| Example No. | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|
| Ingredients of First Electrolyte | | | | | | | | | | | | | | | | |
| Sulfuric acid (g/l) | | | | | 150 | 150 | 150 | 150 | 150 | 150 | 150 | 150 | 300 | 300 | 300 | 300 |
| Oxalic acid (g/l) | | | | | | | | | | | | | | | | |
| Chromic acid (g/l) | 74.3 | | | | | | | | | | | | | | | |
| Phosphoric acid (g/l) | | 300 | 300 | | 300 | 300 | 300 | 300 | 150 | 150 | 150 | 150 | 50 | 50 | 50 | 50 |
| Phosphorous acid (g/l) | | | | 165 | | | | | | | | | | | | |
| Aluminum (g/l) | 0.97 | | 0.93 | 1.43 | | | | | | | | | | | | |
| First Eelctrolysis Conditions | | | | | | | | | | | | | | | | |
| Current density (A/dm²) | 0.55 | 1 | 1.4 | 0.7 | 2 | 1 | 1.5 | 1 | 1.5 | 2 | 2 | 1.5 | 1 | 2 | 2 | 1.5 |
| Temperature (° C) | 53.4 | 20 | 39 | 29 | 20 | 30 | 28 | 30 | 25 | 23 | 28 | 30 | 30 | 20 | 26 | 28 |
| Time (min.) | 40 | 60 | 20 | 40 | 20 | 40 | 30 | 30 | 30 | 20 | 30 | 20 | 60 | 20 | 40 | 60 |
| Thickness of Anodic Oxide Film (μm both sides of sheet) | 1.8 | | | | | | 7.8 | 5.4 | 10.7 | | 19 | 17.9 | | | 26.4 | |
| Ingredients of Second Electrolyte | | | | | | | | | | | | | | | | |
| Cobalt salt (g/l) | 100 | 50 | 50 | 70 | | 50 | 50 | 50 | | 40 | 70 | 50 | | 70 | 10 | 50 |
| Nickel salt (g/l) | | | | 30 | 100 | | 50 | | 30 | | 30 | | 50 | | 40 | 20 |
| Manganese salt (g/l) | 20 | | 50 | 50 | | | | 50 | | 20 | | 50 | | 20 | | 50 |
| Magnesium salt (g/l) | | 10 | | | | 10 | | | | | | | 10 | | | |
| Iron salt (g/l) | | | | | 20 | | | | | | | | | 30 | | |
| Boric acid (g/l) | 20 | 20 | 20 | 20 | 20 | | 30 | 20 | 10 | 30 | 20 | 20 | 15 | 20 | 20 | 20 |
| Glycerine (ml/l) | 30 | 15 | 10 | 15 | 10 | 10 | 15 | 20 | 30 | | 10 | 15 | 20 | 10 | 15 | 10 |
| Urea (g/l) | | | | | | 30 | | | | | | | | 20 | | |
| Thiourea (g/l) | | | 20 | | | | | | | | | | | | | |
| Ammonium sulfate (g/l) | 30 | | | | | | | | 20 | | | 15 | | | | |
| Second Electrolysis Conditions | | | | | | | | | | | | | | | | |
| Electrolysis voltage (V) | 15 | 16 | 14.2 | 15 | 15 | 15.5 | 14.8 | 15 | 15.5 | 15 | 16 | 16 | 15.5 | 15.5 | 16 | 16 |
| Temperature (° C) | 48 | 22 | 12 | 21.5 | 20 | 23 | 26 | 20 | 27 | 20 | 20 | 15 | 22 | 30 | 24 | 20 |
| Time (min.) | 20 | 25 | 15 | 10 | 20 | 25 | 15 | 15 | 30 | 30 | 20 | 20 | 20 | 25 | 30 | 30 |
| pH | 5.79 | 5.5 | 5.7 | 6.1 | 5.8 | 5.6 | 5.9 | 5.6 | 5.5 | 5.9 | 5.65 | 5.7 | 6 | 5.9 | 6.1 | 5.7 |
| Hc in vertical direction (Oe) | 1150 | 350 | 700 | 800 | 92.5 | 700 | 1000 | 1250 | 950 | 1560 | 1075 | 1300 | 800 | 2050 | 675 | 1560 |
| Mr in vertical direction (CGSeum) | 0.023 | 0.021 | 0.010 | 0.016 | 0.053 | 0.022 | 0.033 | 0.036 | 0.052 | 0.060 | 0.051 | 0.062 | 0.050 | 0.01 | 0.027 | 0.068 |
| Hc in horizontal direction (Oe) | 1100 | 325 | 650 | 550 | 225 | 600 | 575 | 650 | 225 | 400 | 800 | 625 | 200 | 900 | 900 | 600 |
| Mr in horizontal direction (CGSemu) (6.0 mm in diameter) | 0.006 | 0.026 | 0.028 | 0.024 | 0.005 | 0.026 | 0.016 | 0.002 | 0.004 | 0.009 | 0.026 | 0.016 | 0.004 | 0.009 | 0.031 | 0.007 |

| Example No. | | 53 | 54 | 55 | 56 | 57 | 58 | 59 | 60 | 61 | 62 | 63 | 64 | 65 | 66 |
|---|---|---|---|---|---|---|---|---|---|---|---|---|---|---|---|

Table 1-continued

| Ingredients of First Electrolyte | | | | | | | | | | | | | | |
|---|---|---|---|---|---|---|---|---|---|---|---|---|---|
| Sulfuric acid (g/l) | 150 | 150 | 150 | 110 | | | | 165 | 300 | 300 | 150 | 150 | 150 | 150 |
| Oxalic acid (g/l) | 50 | 50 | 50 | | | | | | | | | | | |
| Phosphoric acid (g/l) | | | | | | 150 | | | | | | | | |
| Sulfosalicylic acid (g/l) | | | | | 100 | | | | | | 300 | 300 | | |
| Sodium bisulfate (g/l) | | | | | | 120 | 240 | 130 | | | | | | |
| First Electrolysis Conditions | | | | | | | | | | | | | | |
| Current density (A/dm²) | 1.5 | 1.5 | 1.5 | 2 | 1.5 | 1.5 | 1 | 2 | 5.5 | 4 | 7 | 6 | 5.5 | 1.5 |
| Temperature (° C) | 35 | 35 | 35 | 25 | 30 | 30 | 34 | 20 | 30 | 20 | 30 | 20 | 26 | 20 |
| Time (min.) | 15 | 10 | 5 | 30 | 20 | 30 | 30 | 20 | 20 | 20 | 15 | 30 | 30 | 30 |
| Thickness of Anodic Oxide Film (μm both sides of sheet) | | | | | | | | | | | | | | |
| Ingredients of Second Electrolyte | | | | | | | | | | | | | | |
| Cobalt salt (g/l) | 50 | 50 | 50 | 60 | 50 | 50 | 50 | 15 | 50 | 50 | 50 | 70 | 50 | |
| Nickel salt (g/l) | | | | | | | | 35 | | | | | | 50 |
| Manganese salt (g/l) | | | | | | 50 | 50 | | | | | | | |
| magnesium salt (g/l) | 10 | 10 | 10 | 10 | 10 | | | | 10 | 50 | 10 | 10 | 30 | |
| Iron salt (g/l) | | | | | | | | | | 10 | | | | |
| Ammonium sulfamate (g/l) | | | | | | | | | | | 20 | | | |
| Boric acid (g/l) | 20 | 20 | 20 | 15 | 30 | 20 | 20 | 30 | 20 | 20 | 30 | 20 | 20 | 30 |
| Glycerine (ml/l) | 10 | 10 | 10 | 15 | 10 | 10 | 20 | 10 | 10 | 10 | 20 | 10 | 10 | 10 |
| Urea (g/l) | | | | | | | | 10 | | | | | | |
| Thiourea (g/l) | | | | | 20 | | | | | | | | | |
| Ammonium sulfate (g/l) | | | | 10 | | | | | 10 | | | 10 | | |
| Second Electrolysis conditions | | | | | | | | | | | | | | |
| Electrolysis voltage (V) | 15 | 15 | 15 | 15 | 15 | 15 | 15 | 15.5 | 13.5 | 14 | 15 | 15 | 15 | 15.1 |
| Temperature (° C) | 20 | 20 | 20 | 25 | 16 | 17 | 24 | 22 | 18 | 20 | 18 | 20 | 21 | 23 |
| Time (min.) | 15 | 10 | 10 | 20 | 20 | 10 | 10 | 15 | 15 | 10 | 20 | 15 | 15 | 30 |
| pH | 5.6 | 5.5 | 5.5 | 5.7 | 5.6 | 5.5 | 5.8 | 6 | 5.5 | 5.8 | 5.5 | 5.7 | 5.6 | 6 |
| Hc in vertical direction (Oe) | 1200 | 1200 | 1250 | 1300 | 1200 | 1550 | 1000 | 600 | 1350 | 1600 | 1100 | 1400 | 1100 | 700 |
| Mr in vertical direction (CGSeum) | 0.042 | 0.032 | 0.022 | 0.074 | 0.054 | 0.070 | 0.023 | 0.028 | 0.074 | 0.058 | 0.064 | 0.027 | 0.030 | 0.056 |
| Hc in horizontal direction (Oe) | 550 | 550 | 550 | 550 | 500 | 800 | 650 | 650 | 650 | 700 | 700 | 650 | 800 | 175 |
| Mr in horizontal direction (CGSemu) (6.0 mm in diameter) | 0.010 | 0.008 | 0.006 | 0.010 | 0.007 | 0.014 | 0.018 | 0.020 | 0.010 | 0.012 | 0.012 | 0.007 | 0.018 | 0.003 |

EXAMPLE 67

Three magnetic recording materials were prepared by conducting the first electrolytic treatment for a period of time indicated in Table 2 in a first electrolysis bath containing 150 g/l of sulfuric acid at a current density of 1.5 A/dm² and a temperature of 20° C and then conducting the second electrolytic treatment for a period of time indicated in Table 2 in a second electrolysis bath containing 50 g/l of cobalt sulfate and 50 g/l of manganese sulfate at a temperature of 25° C and a pH value of 5.5 under an electrolysis voltage of 15 V (Samples 1, 2 and 3).

Another three magnetic recording materials were prepared by conducting the first electrolytic treatment for a period of time indicated in Table 2 in a first electrolysis bath containing 150 g/l of sulfuric acid and 50 g/l of oxalic acid at a current density of 1.5 A/dm² and a temperature of 35° C, and then conducting the second electrolytic treatment in a second electrolysis bath containing 50 g/l of cobalt sulfate and 10 g/l of magnesium sulfate at a temperature of 22° C and a pH value of 5.5 under an electrolysis voltage of 15 V for a period of time indicated in Table 2 (Samples 4, 5 and 6).

With respect to each of Samples 1 to 6, the coercive force and residual magnetic flux were measured either in the direction vertical to the sample surface or in the direction parallel to the sample surface. Results are shown in Table 2, and in FIGS. 73 (Samples 1 to 3) and 74 (Samples 4 to 5).

Figure 73:
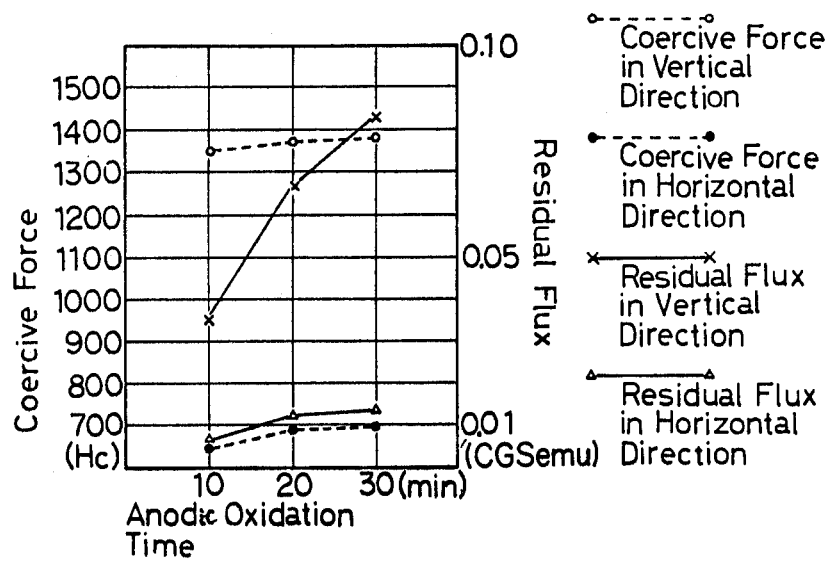
FIGS. 73 and 74 are graphs illustrating influences of the anodic oxidation time to the coercive force and residual magnetic flux in the magnetic recording material of this invention.
Figure 74:
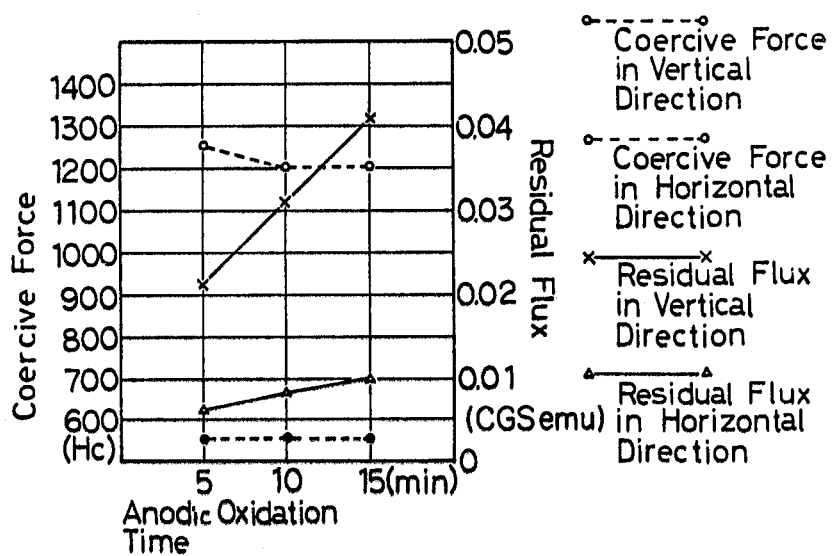

From the results shown in Table 2 and FIGS. 73 and 74, it is seen that in the magnetic recording material of this invention, the residual magnetic flux can be increased by increasing the film thickness (the anodic oxide film thickness is increased when the time for the first electrolytic treatment is made longer, and the magnetic film thickness is increased when the time for the second electrolytic treatment is made longer) without bringing about any substantial change in the coercive force.

Table 2

| Sample No. | Time for First Electrolytic Treatment (minutes) | Time for Second Electrolytic Treatment (minutes) | Coercive Force Hc (Oe) | | Residual Magnetic Flux Mr (CGSemu/0.56cm²) | |
|---|---|---|---|---|---|---|
| | | | vertical direction | parallel direction | vertical direction | parallel direction |
| 1 | 10 | 10 | 1350 | 650 | 0.035 | 0.006 |
| 2 | 20 | 20 | 1375 | 690 | 0.066 | 0.013 |
| 3 | 30 | 30 | 1380 | 700 | 0.083 | 0.014 |
| 4 | 5 | 10 | 1300 | 550 | 0.022 | 0.006 |
| 5 | 10 | 15 | 1250 | 550 | 0.032 | 0.008 |
| 6 | 15 | 20 | 1200 | 550 | 0.041 | 0.010 |

EXAMPLE 68

Magnetic recording materials of this invention obtained in Examples 13, 30, 34, 39, 52 and 66 were compared with the following 5 commercially available products (Comparative Samples 1 to 5) with respect to magnetic characteristics (the measurement was effected with use of the above-mentioned magnetometer of Model VSMP-1 and one magnetic tape test sample sheet of a 6.0 mm diameter was used with respect to each Sample):

Comparative Sample 1: Longplay 150 "E35-3" manufactured by Hitachi-Maxell Kabushiki Kaisha, Japan Comparative Sample 2: Sony-Tape 100 manufactured by Sony Kabushiki Kaisha, Japan Comparative Sample 3: TDK Tape 150-H manufactured by Tokyo Denki Kagaku Kabushiki Kaisha, Japan Comparative Sample 4: Scotch MAGNETIC TAPE 150 manufactured by Sumitomo 3M Kabushiki Kaisha, Japan Comparative Sample 5: Computer Tape manufactured by Fuji Shashin Film Kabushiki Kaisha, Japan Results of the measurement are shown in Table 3, and H-M hysteresis curves of Comparative Samples 1 to 5 of commercially available magnetic recording tapes are shown in FIGS. 68 to 72, respectively.

Table 3

| Magnetic Recording Material | Coercive Force Hc (Oe) | | Residual Magnetic Flux Mr (CGSemu/0.56cm$^2$) | |
|---|---|---|---|---|
| | Vertical direction | Parallel direction | Vertical direction | Parallel direction |
| Products of This Invention | | | | |
| Example 13 | 1550 | 600 | 0.094 | 0.009 |
| Example 30 | 1900 | 750 | 0.059 | 0.007 |
| Example 34 | 1850 | 1100 | 0.040 | 0.013 |
| Example 39 | 700 | 700 | 0.011 | 0.027 |
| Example 52 | 1550 | 600 | 0.067 | 0.007 |
| Example 66 | 700 | 175 | 0.056 | 0.003 |
| Commercially Available Products | | | | |
| Comparative Sample 1 | 300 – 320 | 270 – 280 | 0.008 | 0.018 |
| Comparative Sample 2 | 340 – 350 | 270 – 280 | 0.010 | 0.020 |
| Comparative Sample 3 | 350 – 360 | 310 – 315 | 0.010 | 0.025 |
| Comparative Sample 4 | 375 – 380 | 250 – 260 | 0.010 | 0.015 |
| Comparative Sample 5 | 320 | 310 – 315 | 0.012 | 0.018 |

As is seen from the above results, in all of the commercially available magnetic recording materials, the residual magnetic flux in the direction parallel to the magnetic surface is higher than the residual magnetic flux in the direction vertical to the magnetic surface. For instance, in Comparative Sample 4, the residual magnetic flux Mr in the direction parallel to the magnetic surface, calculated from the hysteresis curve (FIG. 71), is 0.015 CGSemu while the residual magnetic flux Mr in the direction vertical to the magnetic surface is 0.010 CGSemu. Again, in this comparative sample 4, the coercive force Hc is 250 – 260 Oe in the direction parallel to the magnetic surface and 375 – 380 Oe in the direction vertical to the magnetic surface.

In contrast, in the magnetic recording material of this invention, for instance, obtained in Example 66, the residual magnetic flux Mr is 0.003 CGSemu in the direction parallel to the magnetic surface and 0.056 CGSemu in the direction vertical to the magnetic surface, and the coercive force Hc is 175 Oe in the direction parallel to the magnetic surface and 700 Oe in the direction vertical to the magnetic surface. Further, as is seen from the hysteresis curve of this magnetic recording material shown in FIG. 67, the squareness ratio of the hystersis curve of the direction vertical to the surface is very great, and it corresponds to the squareness ratio of the H-M hysteresis curve of the direction parallel to the magnetic surface in commercially available materials, though it is much more excellent than the squareness ratio of the H-M hystersis curve of the parallel direction in commercially available materials. However, with respect to the H-M hysteresis curve of the direction parallel to the magnetic surface in the magnetic material of this invention, the case is contrary to the above. In other words, in the magnetic recording material of this invention, magnetization is more readily accomplished in the direction vertical to the magnetic surface, and in this point the magnetic recording material of this invention is distinguished from conventional magnetic materials in which magnetization is more readily accomplished in the direction parallel to the magnetic surface. Still further, the magnetic recording material of this invention has a much higher coercive force than conventional magnetic materials, and the magnetic recording material of this invention is excellent over conventional magnetic materials in the point that the residual magnetic flux and coercive force can optionally be adjusted. For instance, the magnetic recording material obtained in Example 12 is a typical example having a high residual magnetic flux but a low coercive force, and the magnetic recording material obtained in Example 39 is a typical example in which appropriate residual magnetic flux and coercive force are attained regardless of the direction in which magnetization is more readily accomplished. These characteristic features are not observed in conventional magnetic recording materials at all.

What we claim is:

1. A method for recording information or sound which comprises providing a magnetic recording element having a regular orientation and comprising aluminum or an aluminum alloy containing a predominant proportion of aluminum having on the surface thereof an anodic oxide film of numerous micro pores regularly arranged with a cener-to-center distance between adjacent micro pores within the range of 400-2000A, each of the micro pores being substantially completely filled by electrolytical deposition with a metal or alloy derived from at least one member selected from the group consisting of cobalt salts, nickel salts, chromium salts and iron salts, and magnetizing the magnetic recording element with magnetic flux generated from a magnetic head.

2. A method according to claim 1, wherein the micro pores have a diameter of from 100 to 400A.

* * * * *